July 25, 1950     T. B. GIBBS ET AL     2,516,766
APPARATUS AND METHOD OF MOLDING VARIABLE RESISTORS
Filed Feb. 14, 1947     2 Sheets-Sheet 1
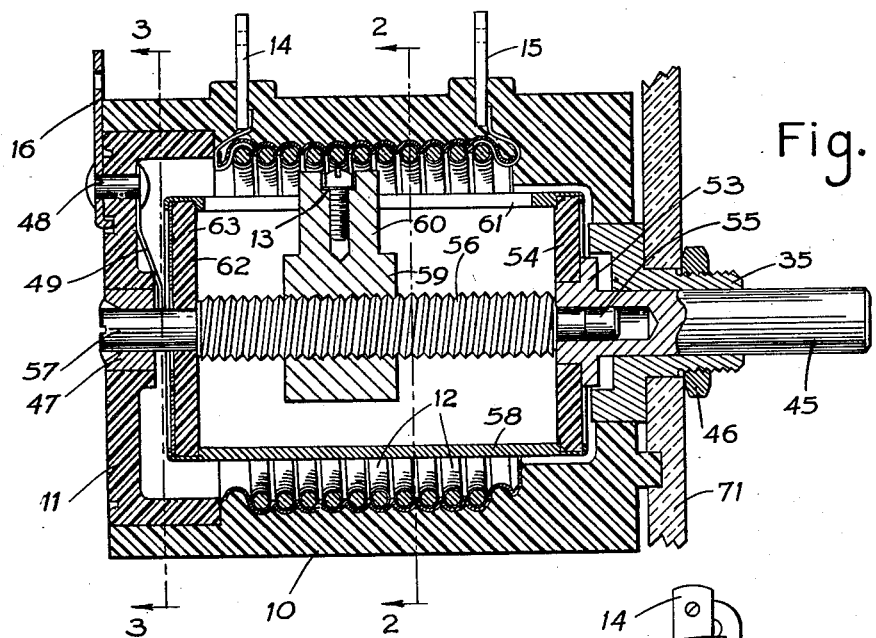
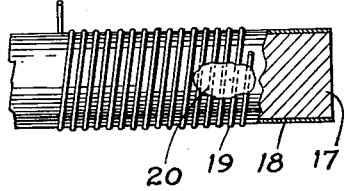
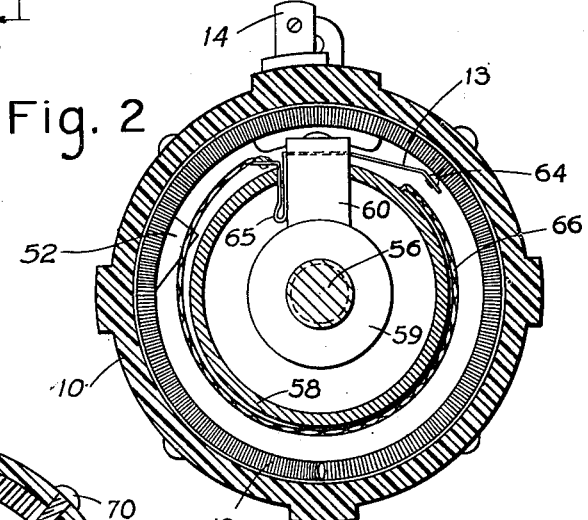
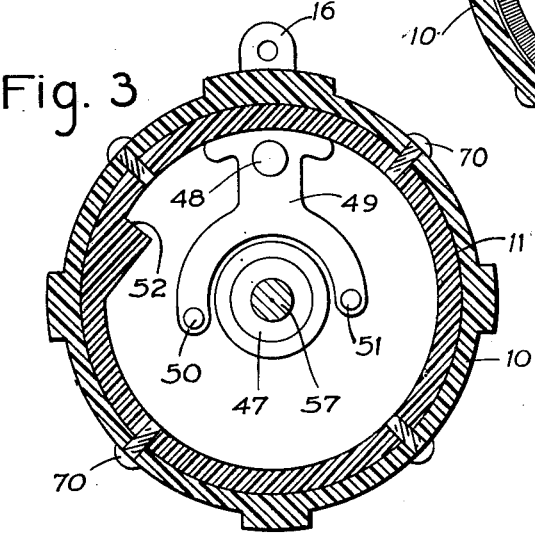
INVENTORS
THOMAS B. GIBBS
GEORGE W. GILMAN
GORDON F. LAING
BY R. J. Richardson
ATTY.

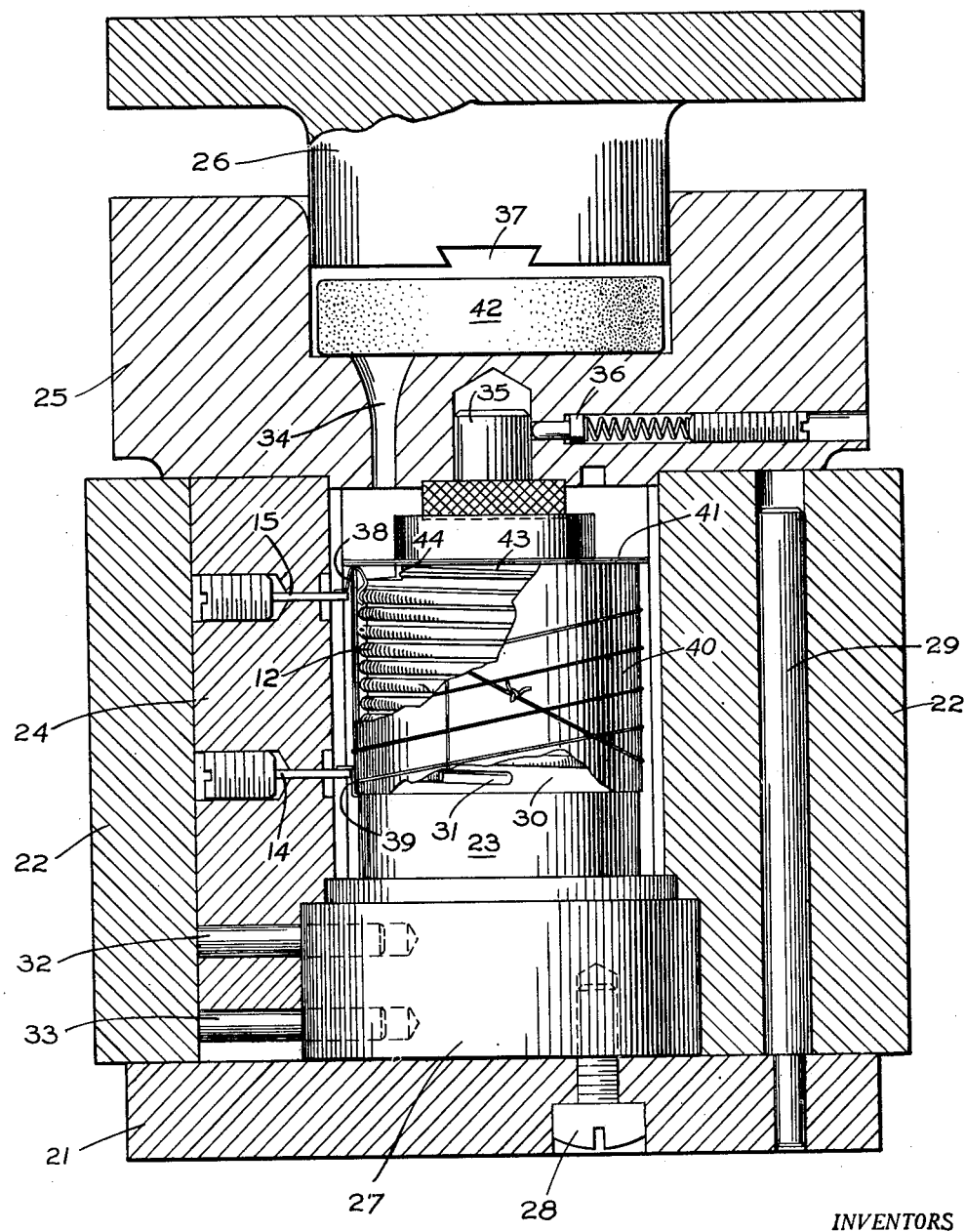

Patented July 25, 1950

2,516,766

UNITED STATES PATENT OFFICE 2,516,766

APPARATUS AND METHOD OF MOLDING VARIABLE RESISTORS

Thomas B. Gibbs, Delavan, George W. Gilman, Janesville, and Gordon F. Laing, Delavan, Wis., assignors to The George W. Borg Corporation, Chicago, Ill., a corporation of Delaware Original application January 20, 1945, Serial No. 573,680, now Patent No. 2,495,321, dated January 24, 1950. Divided and this application February 14, 1947, Serial No. 728,640

10 Claims. (Cl. 18—59)

The present invention relates in general to apparatus and method of molding variable resistors, potentiometers, but more in particular to variable resistors in which the resistance element has the form of a compound helix, and the object of the invention is to produce a new and improved variable resistor of this character.

According to a feature of the invention, the resistance element is of bare resistance wire helically wound on a core which itself has the form of a helix, and the turns of the wire and the turns of the core are partially imbedded in the interior wall of a molded casing which holds the turns in spaced relation.

According to another feature of the invention, a new and improved apparatus and method of molding is provided, whereby the casing is molded in situ of a heat setting plastic material and whereby the material is prevented from flowing to the interior of the helix in the molding operation, thus keeping the resistance wire clean on the inside of the helix where it is engaged by the wiper or contact member of the resistor. This feature is claimed in the instant application, which is a division of application Ser. No. 573,680, filed January 20, 1945, Patent No. 2,495,-321, granted January 24, 1950.

The foregoing and other features of the invention will be described fully hereinafter, reference being had to the accompanying drawings, in which—

Fig. 1 is a vertical section through a variable resistor or potentiometer embodying the invention;

Fig. 2 is a transverse section taken on the line 2—2, Fig. 1;

Fig. 3 is a transverse section taken on the liine 3—3, Fig. 1;

Fig. 4 is a view, partly in section, which shows the construction of the resistance element; and Fig. 5 is a sectional view of a suitable mold with which the process of molding the casing may be carried out.

Referring to the drawings, the variable resistor or potentiometer therein shown comprises a casing 10, having an end closure or cap 11, a resistance element 12 in the form of a compound helix, and a rotatable slider or contact member 13 which is adapted for travel along the resistance element to make contact with the successive turns thereof. The resistance element 12 is provided with terminals 14 and 15 and the slider or contact member 13 has a terminal 16. When the device is used as a potentiometer a source of electrical potential is connected to the terminals 14 and 15 and a variable potential is delivered at the terminal 16 depending on the position of the slider 13, as is well known. When used as a variable resistor connections are made to terminals 16 and 14, or to terminals 16 and 15, and the slider 13 is rotated in one direction or the other to vary the resistance between the connected terminals in known manner.

The resistance element 12 comprises a core 17, Fig. 4, having an insulating coating 18 of suitable insulating material, and a helically wound resistance wire 19. In the device shown, the core is of No. 14 copper wire, and the resistance wire has a diameter of 2.18 mils. The resistance wire is wound on the core in spaced turns, while the core is straight, and the ends of the winding are secured by soldering a few turns together as indicated at 20. This prevents the coils from unwinding. The insulated core with the resistance wire wound thereon is then formed into a helix by winding it on a suitable mandrel having a helical groove therein. In the winding operation the relatively soft copper core is given a permanent set and is removed from the form by unscrewing it in the manner of removing a nut from a bolt.

As illustrated in Fig. 1 of the drawings the core has somewhat more than ten complete turns and the terminals 14 and 15 are 3600 degrees apart, measured in terms of the rotation of the slider or contact member 13. The number of turns in the core helix may be varied, however, as also the size of the core and the size of the resistance wire, in order to vary the ohmic resistance of the resistance element, or for other reasons. The total ohmic resistance of the resistance element shown and described is about 20,000 ohms between terminals.

A suitable mold for making the casing 10 is illustrated in Fig. 5 and comprises the base plate 21, the core 23, the mold 22, the cylinder 25 and the piston 26. The mold is of the extrusion type and its construction conforms generally to the construction of similar molds which are in common use. It will not be necessary therefore to give more than a brief description of the several parts.

The core 23 has a cylindrical base 27 which is secured to the base plate 21 by means of screws such as 28. The mold 22 rests on the base plate 21 and has a cavity which conforms to the outside dimensions of the casing 10. The mold is properly located on the base plate by means of dowel pins such as 29. The base 27 of the core 23 closes the mold cavity at the bottom and the remainder of the core extends into the cavity where it defines the inside wall of the casing. It will be noted that the core includes a cylindrical section 30 which has a helical groove 31. The upper end of section 30 is an annular inclined plane 43 the ends of which are joined by the vertical abutment 44. The reference character 24 indicates an insert which is slidable in the mold 22 and which is attached to the base 27 of the core by means of dowel pins 32 and 33. This insert provides a support for the terminals 14 and 15.

The cylinder 25 closes the mold cavity at the top and has one or more gates such as 34 which lead from the interior of the cylinder to the mold cavity. The cylinder has a centrally disposed recess at the bottom for receiving the bearing member 35, which is held in place by the spring pressed pin 36. The piston 26 has a tapered slot 37 at the end.

It will be understood that means is provided for heating the mold, but since heating means suitable for this purpose is well known, the showing thereof has been omitted in order to avoid complicating the drawings.

The operation of molding a casing will now be described, it being assumed for this purpose that the several parts of the mold are disassembled.

As the first step in the operation a prepared resistance element 12 in the form of a compound helix is taken and is screwed on to the grooved section 30 of the core 23. The turns of the helix are slightly smaller in diameter than the section 30 and the core 17 of the helix has sufficient resiliency to make the helix hug the core and follow the groove 31 as it is screwed on. The groove has a depth equal to about one-half the diameter of the helix core 17 and the turns of the groove are spaced apart so as to separate the turns of the helix and hold them in spaced relation as shown.

The terminal 15, which may be already prepared, has a flexible metal strip 38 soldered to it at one end. The free end of this strip is now soldered to the resistance wire on the upper turn of the helix at a point about an inch or so from the end. The strip 38 overlaps a number of turns of the resistance wire and all these turns are soldered together and to the strip. At this time the strip 38 is straight and together with the terminal 15 extends upward parallel to the axis of the core 23. The terminal 14 is arranged similar to terminal 15 and has a flexible metal strip 39 similar to strip 38 which is soldered to the resistance wire a short distance from the end of the last turn of the helix. As previously mentioned the helix has somewhat more than ten complete turns, preferably about ten and a quarter turns. A suitable guide may be used to facilitate the correct angular location of the terminals and strips when the latter are soldered in place. The terminals may be in vertical alignment, as indicated in Figs. 1 and 5, but if a full 3600 degree range is essential the terminals are spaced apart angularly by a few degrees, or enough to insure that the short-circuited turns of resistance wire at one end of the helix do not overlap those at the other end. Fig. 2 illustrates this in the case of terminal 14, which is angularly displaced to the left, it being understood that terminal 15 is similarly displaced to the right.

Having attached the terminals as described, the operator now applies a covering 40 to the grooved section 30 of the core and the helix 12 supported thereon. This covering consists preferably of several layers of a suitable textile fabric such as linen which is thoroughly coated and impregnated with a heat setting plastic material. This material may be the same kind of material that is to be used for the casing. Bakelite has been used with good results. The covering may be applied by taking a strip of the coated and impregnated fabric cut on the bias, and wrapping it around the helix to form a cylindrical sleeve, then applying a few turns of silk thread and tieing it to hold the sleeve in place. Preferably, however, a number of such sleeves are prepared in advance by wrapping suitable strips of the coated and impregnated fabric on a mandrel and tieing them with thread. With a supply of such sleeves on hand, the operator covers the helix by taking one of the prepared sleeves and slipping it into position around the section 30 of the core, as shown in Fig. 5.

The operator now bends the metal strips 38 and 39 around the ends of sleeve 40 so as to bring the terminals into approximately the positions in which they are shown and then places the mold insert 24 in position on the core 23. To effect this operation the dowel pins 32 and 33 are started into the corresponding holes in the core base 27 and at the same time the terminals are started into the holes in the insert, after which the insert may be pressed into position against the core base. If the terminals 14 and 15 fail to fully enter the holes in the insert they may be pressed in with the aid of a pair of pliers or other instrument.

The operator now takes a couple of washers 41, made of the same material as the sleeve 40, and places them in position on the end of the core as shown.

As mentioned before, suitable heating means is provided for the mold and parts thereof including the core 23. The mold 22 and cylinder 25 may be kept hot, but it is convenient to cut off the supply of heat to the core 23 while the operations just described are being performed. The core will cool off somewhat, therefore, and will have to be re-heated. The heating means may be a hot plate, or an electrical heating element embedded in the base plate 21, for instance. Whatever the means employed may be, the necessity for heating the core may be taken advantage of for partially curing the sleeve 40 and the washers 41, which otherwise would require a separate operation. To attain this object a hood is placed around the core while it is being re-heated, and the heat being confined, the temperature inside the hood is raised sufficiently to bring about the desired partial curing of the sleeve and washers, or rather of the Bakelite material with which they are impregnated.

The heated core may now be placed in position on the bed of the press and the mold 22 may be lowered into position as shown, being properly located with respect to the core by the dowel pins such as 29. The cylinder 25, with the bearing member 35 inserted therein, is then placed on the mold. The cylinder should be so oriented with reference to the mold and core that the gate 34 is not directly above the terminal 15, to avoid danger of breaking the strip 38 by the inflowing Bakelite material.

A preheated cake 42 of Bakelite may now be placed in the cylinder 25, after which pressure is applied by means of the piston 26 in the usual manner. The Bakelite is reduced to a plastic condition and flows into the mold through the gates 34, filling the mold cavity and forming the desired casing. The heat and pressure should be maintained for a sufficient length of time, usually about 3 minutes, to fully cure or set the material.

When the plastic material starts to flow into the mold cavity it first fills the space above the washers 41, but as soon as pressure begins to build up the washers are bent downward around their edges and the plastic material flows down to fill the rest of the mold cavity. These washers seal the end of the sleeve 40 and prevent the entrance of the free flowing plastic material into the sleeve. As soon as the mold cavity becomes filled the pressure builds up to a high value and the heat and pressure softens the Bakelite material with which the washers and sleeve are impregnated. The washers and the sleeve thus become bonded to the rest of the material and form a lining for the casing which under the great pressure applied is caused to conform exactly to the core and to that portion of the resistance element which is exposed outside of the groove 31. Looking at it another way, the main turns of the resistance element and the individual turns of the resistance wire become embedded in the lined casing, which fills the spaces between the turns and the groove 31 beyond the ends of the helix, whereby the resistance element becomes firmly fixed in the casing as it is formed.

After the casing has become cured and set the mold may be removed from the press and taken apart. The cylinder 25, with the piston 26 retained therein, is first separated from the mold 22. This may be accomplished by driving wedges between the cylinder and mold to break off the sprues in the gates 34, after which the cylinder may be lifted off, the bearing member 35 remaining with the casing in which it is embedded. The sprues break where they have the smallest diameter, which is next to the casing. The core 23 may now be removed from the mold by use of a fixture comprising a plate similar to the plate 21 having three pins therein corresponding to the dowel pins 29 but somewhat smaller in diameter. The mold is laid on its side and the fixture is applied to the open end with the pins in the holes occupied by the dowel pins. A few blows with a hammer will now drive the dowel pins and the core out of the mold. The insert 24 comes out with the core, to which it is attached by the dowel pins 32 and 33. With the core out of the mold insert 24 may be pulled off and the completed casing may then be unscrewed from the core. When the piston 26 is removed from the cylinder 25 the residue of molding material, now formed into a Bakelite disc with attached sprues, comes out with the piston from which it can readily be detached by a blow with a hammer. The apparatus is now ready for molding another casing.

The process as described is a hand molding process, but it will be understood that in practice known arrangements for manipulating the mold and parts thereof with the aid of the press will be employed. Each mold should be provided with several cores so that while one core is in the mold other cores may be in course of preparation. Three cores may be used, for example, in a three stage process, comprising an assembly stage, a core heating and sleeve curing stage, and a molding stage.

An essential feature of the process is the use of the sleeve 40 with the associated washers 41, which prevent the free flowing Bakelite from entering between the turns of the resistance wire into the groove 31 of the core and coating the turns of resistance wire on the inside of the helix, where they are engaged by the slider 13. The Bakelite impregnated fabric of which the sleeve is composed readily enters between the turns of the core wire 17 as far as the core of the mold, but the spaces between the resistance wire turns in the groove 31 are very small and the fabric of the sleeve cannot enter them. These spaces are thus effectively sealed off by the sleeve and entrance of the Bakelite into the groove 31 is prevented. This result is promoted by the partial curing of the sleeve and washers prior to the actual molding operation.

Referring now to Fig. 1 again, after the casing 10 has been molded as described, it is placed in a lathe and the bearing member 35 is turned down to the proper dimensions, the hole for the shaft 45 is drilled, and the threads are cut for the nut 46. The casing and resistance element are now ready to be assembled with the other parts to complete the variable resistor or potentiometer.

The cap 11, like the casing 10, is a Bakelite molding and is of the proper size to fit into the open end of the casing, as shown in Figs. 1 and 3. The cap has a centrally disposed metal insert 47 which is drilled and finished after the molding operation is completed. This operation is carried out by any suitable and known process and need not be described.

The terminal 16, on the outside of the cap 11, is secured in place by means of a rivet 48. This rivet also serves to hold the contact spring 49, located on the inside of the cap, and conductively connects the terminal with the contact spring. The contact spring is bifurcated and carries the two contacts 50 and 51, as shown in Fig. 3. Also shown in Fig. 3 is the stop 52 which is formed integrally with the cap. The stop has the same height as the wall on which it is formed.

The shaft 45 is rotatable in the bearing member 35 and has an axial bore at the left hand end to receive the cylindrical end 55 of the lead screw 56. At the other end the lead screw has a cylindrical section 57 which is located in the hole drilled in the metal insert 47 of the cap 11. The lead screw is thus supported on the cap 11 at one end and on the shaft 45 at the other end.

The cylinder 58, preferably made of brass, is supported on the two discs 62 and 54, which are made of suitable insulating material such as micarta. The disc 62 is rotatable on the part 57 of the lead screw, while the disc 54 is rigidly fixed to the shaft 45. The lead screw 56 carries the nut 59 which includes a support 60 for the slider or contact spring 13. This support projects through the longitudinal slot 61 in the cylinder 58.

The shaft 45, lead screw 56, and cylinder 58 are assembled outside the casing 10. The disc 54 is first placed on the shaft against the flange 53 and is secured by staking. The cylinder 58 is then placed in position on the disc 54 and the end of the cylinder is turned in by a spinning operation, which firmly secures the cylinder to the disc. The lead screw 56 with the nut 59 threaded thereon may now be introduced into the cylinder, with the end section 55 inserted in the bearing opening in shaft 45. The disc 62 is then placed on the section 57 of the lead screw and is pressed into the end of cylinder 58. At this point the cylinder and shaft should be tried for end play on the lead screw, holding the disc 62 against the internal shoulder formed in the cylinder 58. The lead screw has shoulders formed at the opposite ends of the threaded section, the end sections 57 and 55 being of reduced diameter, and one of these shoulders is adapted for engagement by the disc 62 and the other by the end of shaft 45. There should be a small amount of end play, sufficient to insure free rotation of the cylinder. To facilitate the manufacturing operations and to insure that another operation will not have to be performed on the lead screw to shorten the distance between the shoulders the parts are preferably so designed and proportioned that ordinarily there will be too much end play. Then during the assembling operation if too much end play is found the excess is taken up by means of one or more small washers placed on the lead screw at one end.

Having tested for end play and having made the necessary adjustment, if any was required, the operator inserts the disc 63 into the end of cylinder 58 on top of the disc 62 and then performs another spinning operation which turns in the end of the cylinder and secures it to the discs 62 and 63. The disc 63 is a contact member, adapted to be engaged by the contacts 50 and 51 on contact spring 49, and is preferably made of silver, or is silver plated.

The contact spring 13 may now be mounted on the support 60 by means of a small screw as shown in Fig. 1. At one end the spring 13 is provided with a contact 64, Fig. 2, and at the other end it is formed into a loop 65 which extends through the slot 61 in cylinder 58 and out again. The slot is necessarily made somewhat wider than the support to insure that the support will be freely movable, but the play which would otherwise result from this construction is taken up by the spring, which holds the support against one side of the slot. The nut 59 and support 60 are made of suitable insulating material and may be of molded Bakelite, for example. No filler should be used.

The contact spring 13 is conductively connected to the cylinder by means of a flexible braided conductor 66 which has one end soldered to the contact spring 13 and the other end soldered to the cylinder 58. The conductor 66 should be attached to the cylinder at a point about midway between the ends of the cylinder and should be long enough to permit movement of the support 60 along the slot 61 as far as it can go in both directions but not so long that it can touch the resistance element when the support is centrally located in the slot and the conductor is slack.

When the shaft 45, lead screw 56, cylinder 58 and the associated parts have been assembled as described, they are ready for assembly in the casing 10. For this purpose the casing is supported in a fixture which holds it in a vertical position with the open end up. The shaft 45 is now rotated in a counter-clockwise direction relative to lead screw 56 until the support 60 comes to the end of the slot 61 in cylinder 58 and is then rotated approximately 90 degrees in a clockwise direction. The cylinder assembly is then brought to a position above the casing, with the shaft 45 extending downward, and is so oriented relative to the casing that the contact 64 on contact spring 13 is in alignment with the terminal 14. From this position the cylinder assembly is lowered into the casing, the shaft 45 entering its bearing in the bearing member 35, until the movement is arrested by the end of shaft 45 engaging a stop with which the fixture is provided. The operator now inspects the contact 64 through the open end of the casing to make sure that it is properly centered on the end turn of the resistance element and adjusts the stop up or down if necessary.

The cap 11 is now inserted in the end of the casing 10, with the lead screw projecting through the hole in the metal insert 47. The cap should be inserted with the terminal 16 a few degrees past terminal 14 in a clockwise direction to insure that the stop 52 will clear the support 60. The cap having been seated properly, the operator holds the lead screw with a screw driver and rotates the cap in a counter-clockwise direction far enough to bring the terminal 16 into alignment with terminals 14 and 15. The lead screw is now soldered to the insert 47 and the casing with the parts assembled therein is removed from the fixture.

The next operation is the adjustment of the stop 52. In order to carry out this adjustment an ohmmeter is connected between the terminals 16 and 14, the support 60 is held against the stop by applying a counter-clockwise torque to the shaft 45, and the stop is adjusted by rotating the cap 11 in one direction or the other until the contact 64 is positioned on the last turn of the resistance wire which is soldered to the strip 38, counting from the end of the resistance element. In this position of the contact the ohmmeter will read substantially zero and will show an increased reading immediately responsive to clockwise rotation of the shaft 45. When the adjustment is completed the cap is temporarily held in position by a strip of tape to avoid any danger of its rotating relative to the casing.

The device may now be inspected and tested that if no defects are found the holes are drilled for the drive screws such as 70 and the screws are inserted. The cap 11 is thus securely fixed in the casing.

The finished device may be mounted on a panel, such as 71, as shown in Fig. 1. A knob may be mounted on the shaft 45 for rotating it, or the shaft may be rotated by gears, a flexible shaft, etc. depending on the particular situation in which the device is employed.

As mentioned before, the device is adapted to function either as a variable resistor or as a potentiometer. Assuming that it is to be used in the former capacity, the necessary circuit connections are made to the terminals 16 and 14. The circuit through the variable resistor extends from terminal 16 by way of rivet 48, spring 49 and contacts 50 and 51 in parallel, disc 63, cylinder 58, conductor 66, slider or contact spring 13 and contact 64, resistance wire 19 of the resistance element, and strip 38 to terminal 14. With the support 60 resting against the stop 52, which is the counter-clockwise stop, only about one-half turn or less of the resistance wire is included in the circuit and the resistance between the terminals is substantially zero.

When the shaft 45 is rotated in a clockwise direction, the cylinder 58 rotates the support 60 and nut 59 on the lead screw 56, causing the support 60 to travel to the right along the slot 61 in the cylinder. The threads of the lead screw have the same pitch as the helical turns of the core of the resistance element, so that as the support 60 is rotated the contact 64 travels along the resistance element and engages successive turns of the resistance wire. As the turns are cut into the circuit one after the other the resistance between the terminals 16 and 14 is proportionately increased, as will be understood.

When the shaft has been rotated somewhat less than 360 degrees the support 60 has moved far enough to the right so that it clears the stop 52 when it passes it. The rotation in a clockwise direction may continue for 3240 degrees more, or for a total of 3600 degrees, when the support 60 will engage the clockwise stop and the rotation will cease. The clockwise stop is not shown, but it will be understood that it is formed in the end of the casing 10 by the abutment 44, Fig. 5. The contact 64 will now be in engagement with a turn of the resistance wire which is adjacent the turns soldered to the strip 38 associated with terminal 15 and the resistance between terminals 16 and 14 will be a maximum.

It will be noted that clockwise rotation of the shaft 45 increases the resistance while counter-clockwise rotation of the shaft decreases the resistance. For any particular angular setting of the shaft the resistance will always be the same regardless of whether the setting is approached in a clockwise or counter-clockwise direction. This desirable result is due to the fact that there is no lost motion in the drive between the cylinder 58 and the support 60, the part 65 of the contact spring 13 being effective to hold the support against the side of the slot 61 in the cylinder.

The operation of the device as a potentiometer will be understood from what has already been said and need not be explained in detail.

While my improved method of molding has been described with reference to a specific article and with the use of specific materials it will be understood that this has been done to facilitate the description and without intending to limit the invention. Other articles can be made and other types of plastic materials can be used in certain cases, materials known as thermo-plastics, for example. I do not therefore wish to be restricted to the exact form of the invention which is shown and described herein but desire to include and have protected by Letters Patent all forms and modifications thereof which come within the scope of the appended claims.

We claim:

1. The method of molding a casing around a resistance element having the form of a compound helix, which consists in providing a mold having a helically grooved core, supporting said resistance element on said core, covering said resistance element and the grooved portion of the core with a layer of textile fabric impregnated with a partially cured heat setting plastic material, inserting the core in the mold, and injecting heat setting plastic material into the mold under sufficient heat and pressure to complete the cure of the plastic material in said fabric and establish a bond between said material and the injected plastic material.

2. The method of molding a heat setting plastic material to make a supporting casing for a resistance element having the form of a compound helix, which consists in providing a mold having a helically grooved core on which the resistance element is supported with the turns thereof in spaced relation, placing a part of said material in the mold along with the core, such material being partially cured and disposed as a covering for the resistance element and the grooved portion of the core, and injecting the remainder of said material into the mold under sufficient heat and pressure to force said covering into continuous engagement with the turns of said helix and the portions of said core which are exposed in the spaces between them.

3. The method of molding a casing around a resistance element comprising a form wound into a multi-turn helix, said form having a resistance wire wound thereon in spaced turns, which consists in providing a mold with a helically grooved core to support said helix with the turns thereof in spaced relation, applying a covering to said core and helix comprising a layer of partially cured heat setting plastic material reinforced by a textile fabric, inserting the covered core and helix in the mold, and injecting a heat setting plastic material into the mold under sufficient heat and pressure to form said casing and to convert said covering layer into a lining for the casing in which the turns of said helix and the turns of said resistance wire are embedded.

4. The method of molding a casing around a resistance element having the form of a compound helix, which consists in providing a mold having a helically grooved core, supporting said resistance element on said core, covering said resistance element and the grooved portion of said core with a layer of reinforcing material impregnated with heat setting plastic material, heating said layer to partially cure said plastic material, inserting said core into said mold, and injecting heat setting plastic material into the mold under heat and pressure.

5. The method of molding a casing around a resistance element having a support formed into a multi-turn helix, said support having a bare resistance wire helically wound thereon in spaced turns, which consists in providing a mold having a helically grooved core, screwing said helix on said core, covering said helix and the grooved portion of said core with reinforcing material adapted to block the spaces between the turns of said resistance wire against the flow of plastic material into the grooves of said core, inserting said core into said mold, and injecting plastic material into the mold under heat and pressure.

6. Apparatus for molding a casing around a resistance element having the form of a compound helix, comprising a mold having a cavity therein, a core adapted to be inserted into said cavity, said core comprising a cylindrical section having a helical groove for supporting said resistance element, said core including also a section of reduced diameter forming an annular shoulder at the end of said cylindrical section, and said shoulder having the form of a plane which is inclined circumferentially of the core with approximately the same slope as the slope of the said groove, whereby one end of the plane is displaced from the other end axially of the core, and a relatively steep abutment connecting said ends.

7. The method of molding a casing around a resistance element comprising an insulating support wound into a multi-turn helix, said support having a resistance wire wound thereon in spaced turns, which consists in providing a mold with a helically grooved core on which the resistance element is supported with the helix turns in spaced relation, inserting said core and resistance element into said mold, injecting plastic material into said mold under heat and pressure, and blocking the flow of plastic material into the groove of said core through the spaces between the turns of said wire by means of material which is disposed around the resistance element as a covering before the core is inserted into the mold.

8. Apparatus for molding a casing around a resistance element which comprises a bare resistance wire wound on a resilient support, said support being formed into a helix having a plurality of contacting turns, said apparatus comprising a mold having a cavity therein, a core adapted to be inserted into said cavity and having a base for closing the same at one end, said core including a section having a helical rib in the nature of a screw thread having a greater pitch than the said helix, whereby the turns of the helix are separated when the resistance element is screwed on to said section prior to insertion of the core in the mold said core section having an overall diameter which is less than the diameter of said cavity, whereby said helical rib is spaced away from the wall of said cavity, the height of said rib being less than the diameter of said support, whereby the helix turns lie partly between adjacent turns of the helical rib and partly in the space between the core and the inside wall of said cavity but out of contact with said wall, means for closing the mold at the other end, and means for injecting plastic material into said cavity under heat and pressure.

9. The method of molding a casing around a resistance element having the form of a compound helix, which consists in providing a mold having a helically grooved core, supporting said resistance element on said core, covering said resistance element and the grooved portion of the core with a layer of textile material impregnated with a heat setting plastic material, heating said fabric after its application to said element and core to partially cure said plastic material, inserting the core in the mold, injecting heat setting plastic material into the mold, and completing the cure of the plastic material in said fabric by applying heat and pressure to the injected plastic material.

10. The method of molding a casing around a resistance element comprising an insulating support wound into a multi-turn helix, said support having a bare resistance wire wound thereon in spaced turns, which consists in providing a mold with a helically grooved core on which the resistance element is supported with the helix turns in spaced relation, inserting said core and resistance element into said mold, injecting plastic material into said mold under heat and pressure, and preventing the injected plastic material from insulating those portions of the turns of the resistance wire which are located in the groove of said core by covering the resistance element with a plastic impregnated fabric prior to the insertion of the core and resistance element into the mold.

THOMAS B. GIBBS.
GEORGE W. GILMAN.
GORDON F. LAING.

REFERENCES CITED

The following references are of record in the file of this patent:

UNITED STATES PATENTS

| Number | Name | Date |
|---|---|---|
| 1,315,365 | Hamm | Sept. 9, 1919 |
| 1,630,874 | Tuska | May 31, 1927 |
| 1,982,279 | Apple | Nov. 27, 1934 |
| 2,095,705 | Kessler | Oct. 12, 1937 |
| 2,323,286 | Ward | June 29, 1943 |